Jan. 6, 1942.　　　　T. LINGA　　　　2,268,836
MOTOR VEHICLE ACCESSORY
Filed June 18, 1938　　　　2 Sheets-Sheet 1
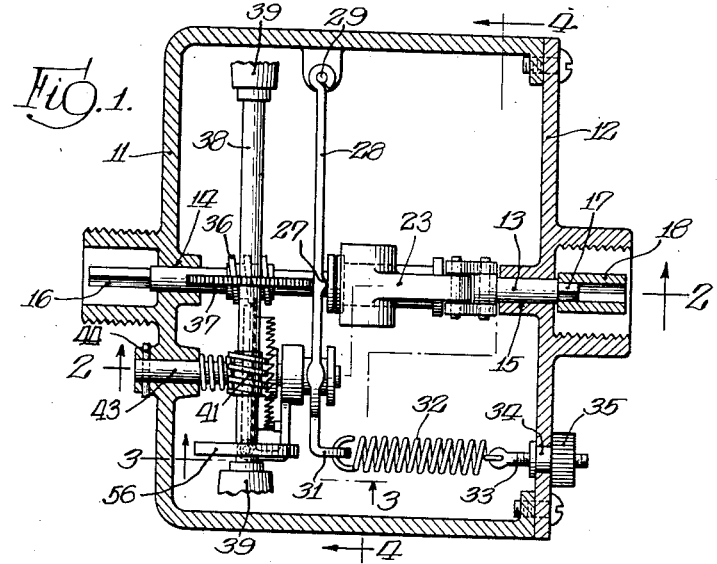
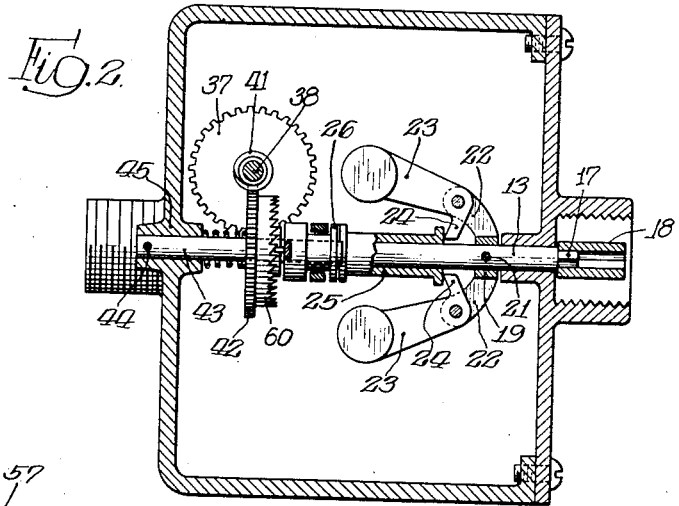
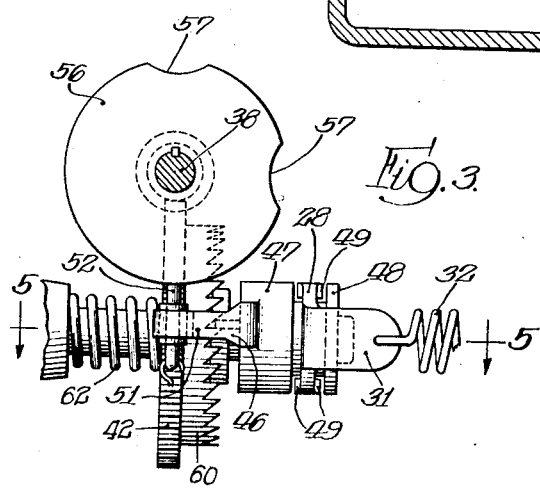
INVENTOR.
Torbjorn Linga
BY Walter M. Fuller
ATTORNEY.

Jan. 6, 1942. T. LINGA 2,268,836
MOTOR VEHICLE ACCESSORY
Filed June 18, 1938 2 Sheets-Sheet 2
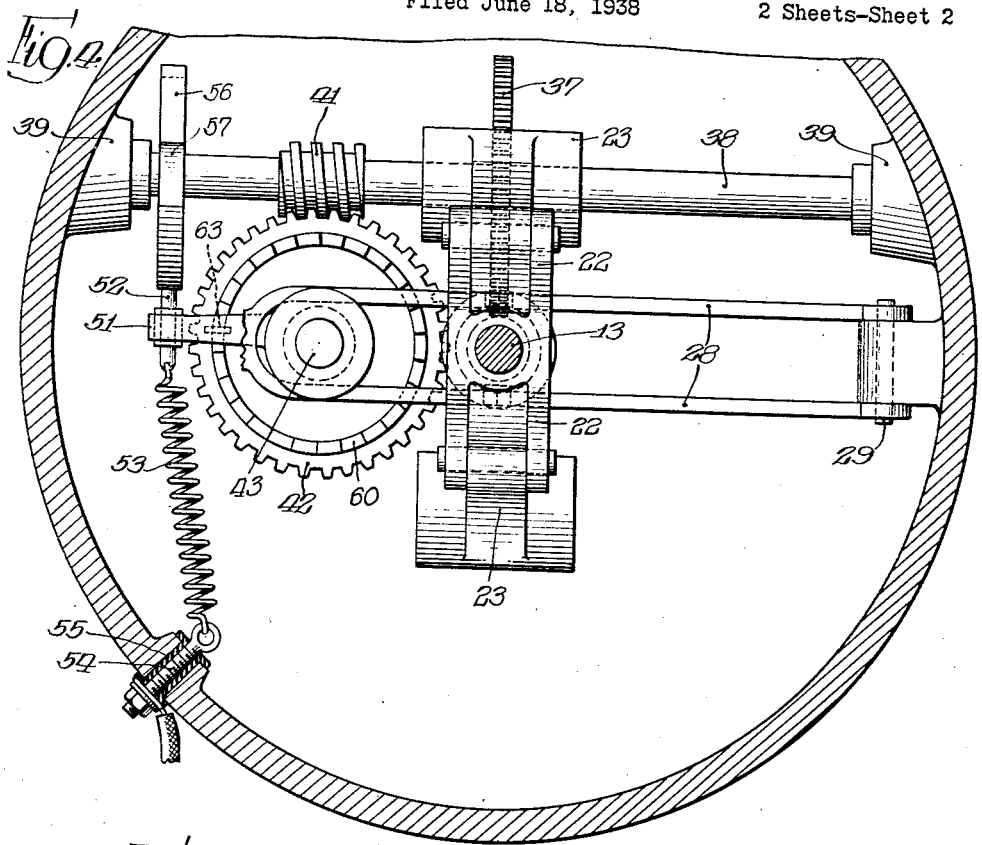
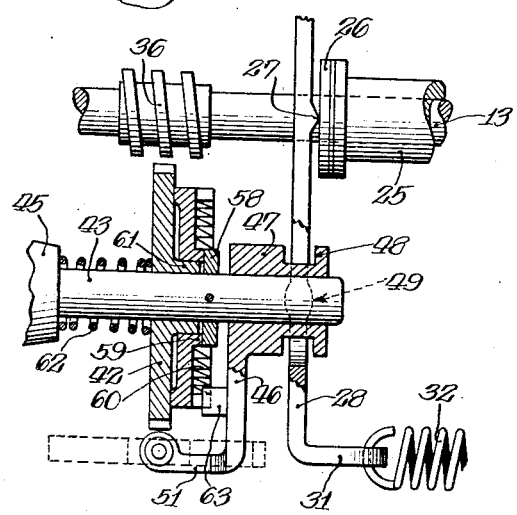 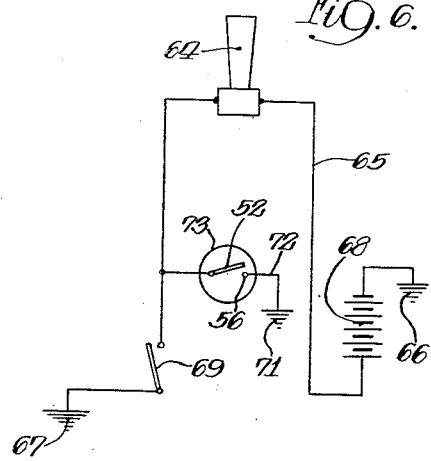
INVENTOR.
Torbjörn Linga
BY Walter M. Fuller
ATTORNEY.

Patented Jan. 6, 1942

2,268,836

UNITED STATES PATENT OFFICE 2,268,836

MOTOR VEHICLE ACCESSORY

Torbjorn Linga, Kokomo, Ind.

Application June 18, 1938, Serial No. 214,697

2 Claims. (Cl. 177—311.5)

Owners of fleets of automobiles and others, in order to prevent the use of excessive speeds of motor-vehicles, to reduce the possibility of accidents, to lessen the consumption of fuel, and to foster more careful driving conditions have provided the cars, heretofore, with speed-limiting appliances which prevented the cars from being operated at rates of travel in excess of a predetermined amount, such, for example, as 50 miles per hour, but, in obtaining the specific advantages or objects in a measure, it has been found that such positive speed restrictions have certain drawbacks or inexpedient features especially in emergencies where higher speeds for short periods were desirable.

Accordingly, one main object of the present invention is to provide an appliance which meets the present conditions to better advantage, in that it allows the operator of the automobile to drive the car for a limited time period only, or for a definite distance, at a speed greater than the predetermined limit, but, if such distance is exceeded, means automatically come into action calling the operator's attention to such fact, as, for example, by the operation of the horn which is then not under the control of the driver.

Thus, if the driver of the car requires the higher speed for a short duration, or relatively short distance, as in passing another car while a third one is approaching from the opposite direction at a greater speed than was at first contemplated, he can use any speed necessary for safety, but, if the distance travelled at such high speed exceeds that for which the appliance is set, the horn sounds automatically as long as the excess rate of travel above the definite amount continues.

Of course, such sounding of the horn may, probably will, and is intended to, annoy the driver, but he can continue his high speed until safety permits its reduction to less than that predetermined, whereupon the horn automatically becomes inactive.

From what precedes, it will be clear that the driver can use any speed he prefers, but, if he drives at a rate greater than that for which the device is set or adjusted for a distance greater than that for which the appliance is fixed, he does so under conditions which positively and perhaps irritatingly direct not only his own but others' attention to that fact.

Obviously, instead of blowing the horn, some other factor could be brought into play which would discourage, but not preclude, prolongation of speed and distance above their set limits.

To enable those acquainted with this art to fully understand the invention, both from functional and structural standpoints, a present preferred embodiment of the invention has been illustrated in the accompanying drawings forming a part of this specification and to which reference should be had in connection with the following detailed description, and, for simplicity, like reference numerals have been employed throughout the several views of the drawings to designate the same parts.

In these drawings:

Figure 1 is a substantially-central section through the novel appliance;

Figure 2 is a section on the broken line 2—2 of Figure 1;

Figure 3 is a fragmentary, enlarged section on line 3—3 of Figure 1;

Figure 4 is an enlarged section on line 4—4 of Figure 1;

Figure 5 is a section on line 5—5 of Figure 3; and

Figure 6 is a diagram of the wiring circuit for the horn of the automobile fitted with the new safety device.

By reference to the several views of the drawings, it will be apparent that the novel and improved appliance includes a cylindrical casing 11 whose mouth is closed by a cover 12 and that a rotary shaft 13 extends through such housing with suitable bearings 14, 15 therefor in the casing-wall and in the closure, respectively.

This apparatus is designed to be inserted in the operative connection between the automobile and its speedometer, and, to this end, one protruding end 16 of the specified shaft is made square in cross-section for direct connection with the speedometer (not illustrated), whereas its other projecting square end 17 is fitted with a sleeve or coupling 18, the opening through which receives such end 17 leaving a space square in cross-section designed to accommodate the like-shaped end of the speedometer drive-shaft, not shown.

Thus the travel of the automobile directly causes the rotation of the shaft 13 at a speed proportional to that of the travel of the vehicle on which it is mounted.

Shaft 13 has a collar 19 pinned thereon at 21, such collar having two pairs of spaced arms 22, 22 on which are pivoted or hinged two fly-ball governor-arms 23, 23, each of which has an extension or foot 24, bearing against one end of a sleeve 25 slidable on the shaft and having an enlargement 26 at its opposite end against which bear projections 27, 27 on a slotted arm 28 straddling the shaft and hinged to the casing-wall at 29 and having at its opposite end a laterally-bent ear 31 (Figure 1) to which one end of a contractile coiled spring 32 is attached, the other end of the spring being secured to a screw 33 slidingly accommodates in a bearing 34 in the casing-cover 12, the screw externally of the cover having an adjustable nut 35 by means of which the tension on the spring may be regulated.

From this, it will be seen that the spring 32 acts indirectly on the fly-ball governor weights or balls in opposition to their outward movement under the action of centrifugal force.

A worm 36 (Fig. 1) on shaft 13 meshes with and consequently rotates a worm-wheel 37 (Figs. 1 and 4) and its shaft 38 revoluble in bearings 39, 39 at a materially reduced speed, and shaft 38 in turn has a worm 41 in cooperative relation with and rotating a worm-wheel 42 free both to turn and to slide on a stationary stud-shaft 43 fixed, as by a cross-pin 44, in a bearing 45 in the wall of the housing 11, whereby such worm-wheel 42 is revolved at a much less speed of rotation than that of the main-shaft 13 by which it is driven.

Slidable and also capable of turning on shaft 43 is a member 46 having a cylindrical hub-portion 47 fitted on the shaft and provided externally with a circular groove 48 accommodating enlargements 49 on the upper and lower parts of the hinged arm 28, whereby rocking of arm 28, as occasioned by the fly-wheel governor 23, 24 slides member 46 on shaft 43.

A bent portion 51 of element 46 carries an electric-contact 52, and it and the member 46 are normally pulled down into inoperative position by a coiled contractile spring 53 one end of which is connected thereto, whereas its other end is joined to a fixed screw 54 extended through the casing and insulated therefrom by a bushing 55.

Above contact 52, shaft 38 has fixed thereon and hence constantly rotatable therewith, a circular, contact, metal disc 56, grounded through the casing or housing 11, and having two, spaced, marginal recesses 57, 57 (Fig. 3).

As is perhaps most clearly shown in Figure 5, a collar 58 is pinned on the stationary shaft 43 and the hub 59 of a circular ratchet-wheel 60 bears against a side face of the collar, such hub being mounted for rotation on the hub 61 of the worm-wheel 42, the element 42 being pressed against the ratchet-wheel by a coiled-spring 62 interposed between the bearing 45 and the worm-wheel, so that normally, because of the frictional engagement between the parts 42 and 60, the ratchet-wheel is rotated by and with the worm-wheel.

Member 46 on one face has a tooth or lug 63 adapted to engage and to be disengaged from the teeth of the ratchet-wheel 60 depending upon the position of the weights of the fly-ball governor acting through sleeve 25, arm 28 and member 46.

Referring to Figure 6, the horn 64 of the automobile is connected in an electric circuit 65 both ends of which are grounded on the car-body or frame at 66 and 67, such circuit including the usual battery 68 and an electric-switch or push-button 69 by means of which the circuit may be temporarily manually closed to sound the horn as an alarm.

Also grounded on the vehicle at 71 is a circuit 72 shunted around the switch 69 and containing the novel appliance 73 described above and embodying the present invention and including diagrammatically the electric-switch 52, 56.

Obviously when the two elements 52 and 56 are in contact the horn will automatically be sounded.

The novel apparatus operates substantially as follows assuming that the adjustment member 35 is sealed or otherwise prevented from manipulation by the operator of the automobile equipped with the device.

When the vehicle is travelling at any speed below the predetermined one, say 50 miles per hour, for which the appliance is set, the centrifugal fly-ball governor allows the spring 32 to hold the tooth or pawl 63 of the arm 46 retracted from the circular ratchet 60 and the member 46 is pulled down away from the element 56 by the spring 53.

When the speed of 50 miles per hour is exceeded, the fly-ball governor overcomes the pull of spring 32 and permits the pawl or tooth to engage one of the teeth of the rotating ratchet 60, whereupon the arm 46 gradually swings upwardly against the action of spring 53, and, after the vehicle has travelled a predetermined distance at the excess speed, contact 52 engages the edge of contact-disc 56 thus closing the shunt-circuit 72 and causing the horn to sound.

As soon as further upward travel of arm 46 and its contact 52 are prevented by the disc 56 of course the ratchet cannot turn being held from so doing by the tooth 63 and thereafter the worm-wheel 42 continues to rotate but merely slides on the face of the ratchet member, or, in other words, the usual friction-drive between the parts 42 and 60 becomes inoperative because the ratchet-wheel is held against rotation.

So long as the undue speed of the vehicle continues, the horn blows with alternate long and short blasts by reason of the long and short edge portions between the cavities 57, 57 which produce the intervals between the unequal time periods of the horn operation.

Arm 46 tends to swing upwardly much slower than the rotation of disc 56 so that, when the recesses 57 register with the contact 52, the latter is temporarily out of engagement with the margin of the contact disc.

Thus the operator of the automobile can run the car at any excessive speed for as long a time as he cares to but subject, however, to the disturbing action of the horn not only on himself, but also on all others within its range of hearing, after the car has travelled the initial or preliminary permissible distance before the horn begins its distracting attention to the fact that the car is being improperly operated unless a critical situation then exists warranting the undue speed for a time beyond that for which the device is set.

As soon as the vehicle's speed diminishes below that for which the appliance is adjusted, the governor allows the spring 32 to withdraw the member 46 and its pawl 63 from operative association with the ratchet-wheel, whereupon the rotation of the latter by the worm-wheel 42 is immediately reestablished and the now released arm 46 and its tooth 63 and its contact 52 are quickly rocked down into inoperative position by the retractive action of spring 53.

Obviously the specified movements of these elements break the shunt circuit 72 and the automatic operation of the horn ceases until the contacts are again brought together when the driver of the car again speeds excessively for a distance greater than that allowable.

It will, of course, be understood that, if the high speed is discontinued before the allowable distance is traversed, contact 52 will not reach the disc 56 during the partial upward swing of the former, the horn will not be sounded, and the contact 52 and its carrying arm 46 will automatically rock down as soon as the speed is less than that for which the appliance is adjusted.

Those skilled in this art will readily understand that the invention as defined by the following claims, which should be construed as broadly as permitted by the prior art, is not necessarily limited or restricted to the process and exact details of structure illustrated and described and that various modifications may be resorted to without departure from the heart and essence of the invention.

For example, in some cases, it may be desirable to make the part 26 as a ring and to provide a friction-reducing ball-bearing between it and the end of the sleeve 25.

It will be readily understood, that the apparatus can also be so constructed as to allow no (or only an imperceptible) distance of travel at excess speed without the horn blowing. This would be accomplished either by permitting spring 53 to pull contact point 52 only a very short distance away from the edge of disc 56, or by gearing the ratchet-wheel 60 and disc 56 to a greater speed in relation to shaft 13, or both methods in combination.

I claim:

1. For use in an automobile-accessory having a suitably-journaled shaft adapted for mounting on the automobile and for rotation on its axis by the automobile at a speed always proportional to the speed of travel of the automobile, an electric-circuit, an electrically-actuated signal in said circuit, an electric-switch in and controlling said circuit and the operation of said signal and having at least one of its two contacts movable, a mounting for said movable switch-contact permitting it to travel toward and from its companion contact of the switch, a governor operated solely by said shaft and at a speed always proportional to that of the travel of the automobile, and means controlled by said governor to cause the closing of said switch and to permit the opening of said switch and the corresponding operation of said signal, the novel features being that said governor-controlled means includes a coupling between said shaft and said movable switch-contact mounting rendered operative and inoperative by said governor and that said movable switch-contact mounting is equipped with a spring to immediately return said contact to normal open position as soon as said coupling is rendered inoperative by said governor, whereby, when the travel of the automobile reaches a predetermined speed, said coupling is made operative to carry said movable contact at a speed proportional to that of the automobile to its companion switch-contact in delayed manner so that said signal becomes operative only after the automobile has travelled a predetermined distance at a speed in excess of said predetermined speed and remains operative so long only as said excess speed continues, and becomes immediately inoperative upon reduction of the speed of the automobile to said predetermined speed by reason of the opening of the switch by said spring.

2. The novel features in automobile-accessories set forth in claim 1 including the additional novel features of said coupling including a revoluble ratchet-wheel, a friction-drive for said ratchet-wheel actuated by said shaft, and a pawl associated with said movable switch-contact mounting and shifted into and out of operative relation with said ratchet-wheel by said governor, said friction-drive permitting said ratchet-wheel to remain stationary so long as said movable contact engages its companion switch-contact.

TORBJORN LINGA.